March 25, 1930.  P. GREENWALD  1,751,477
METHOD OF AND APPARATUS FOR MAKING INFUSIONS
OF COFFEE, TEA, AND THE LIKE
Filed July 17, 1928  2 Sheets-Sheet 2
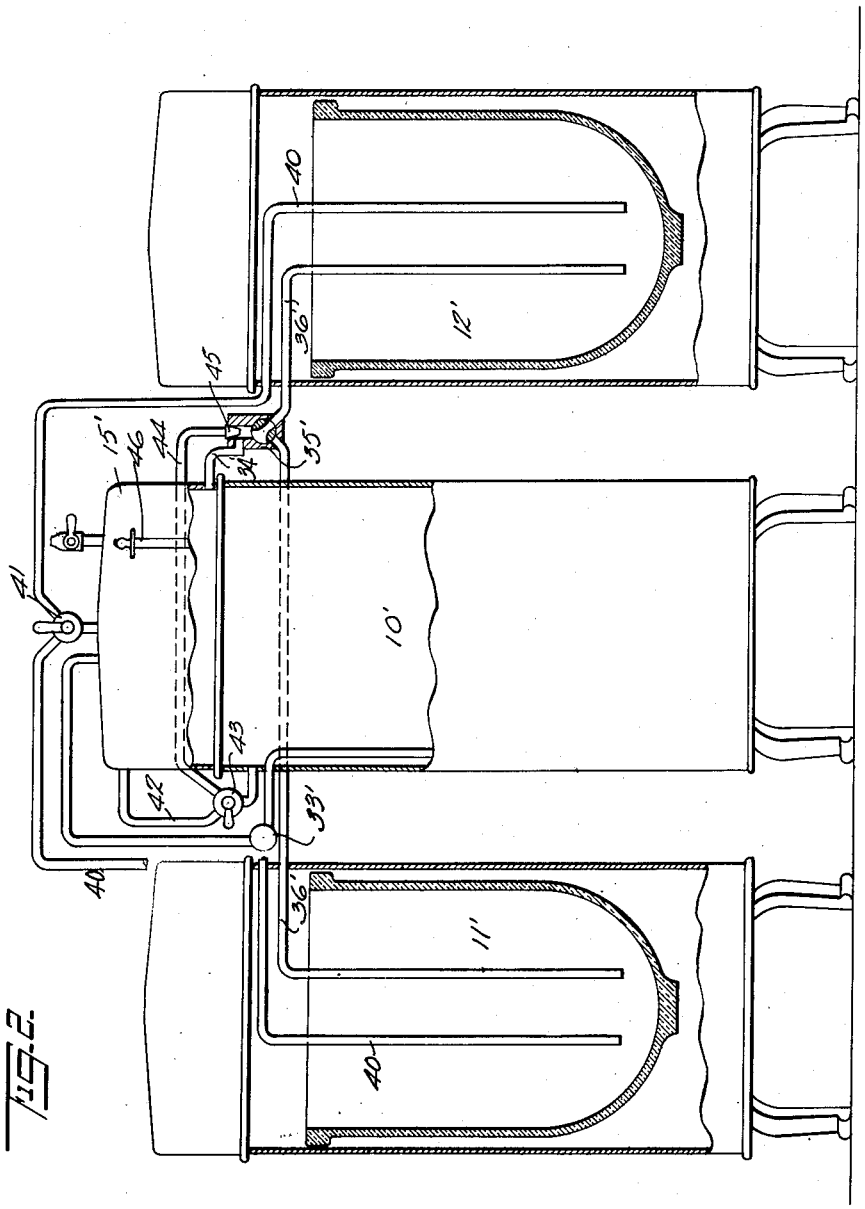
INVENTOR
PAUL GREENWALD
BY
ATTORNEY Patented Mar. 25, 1930

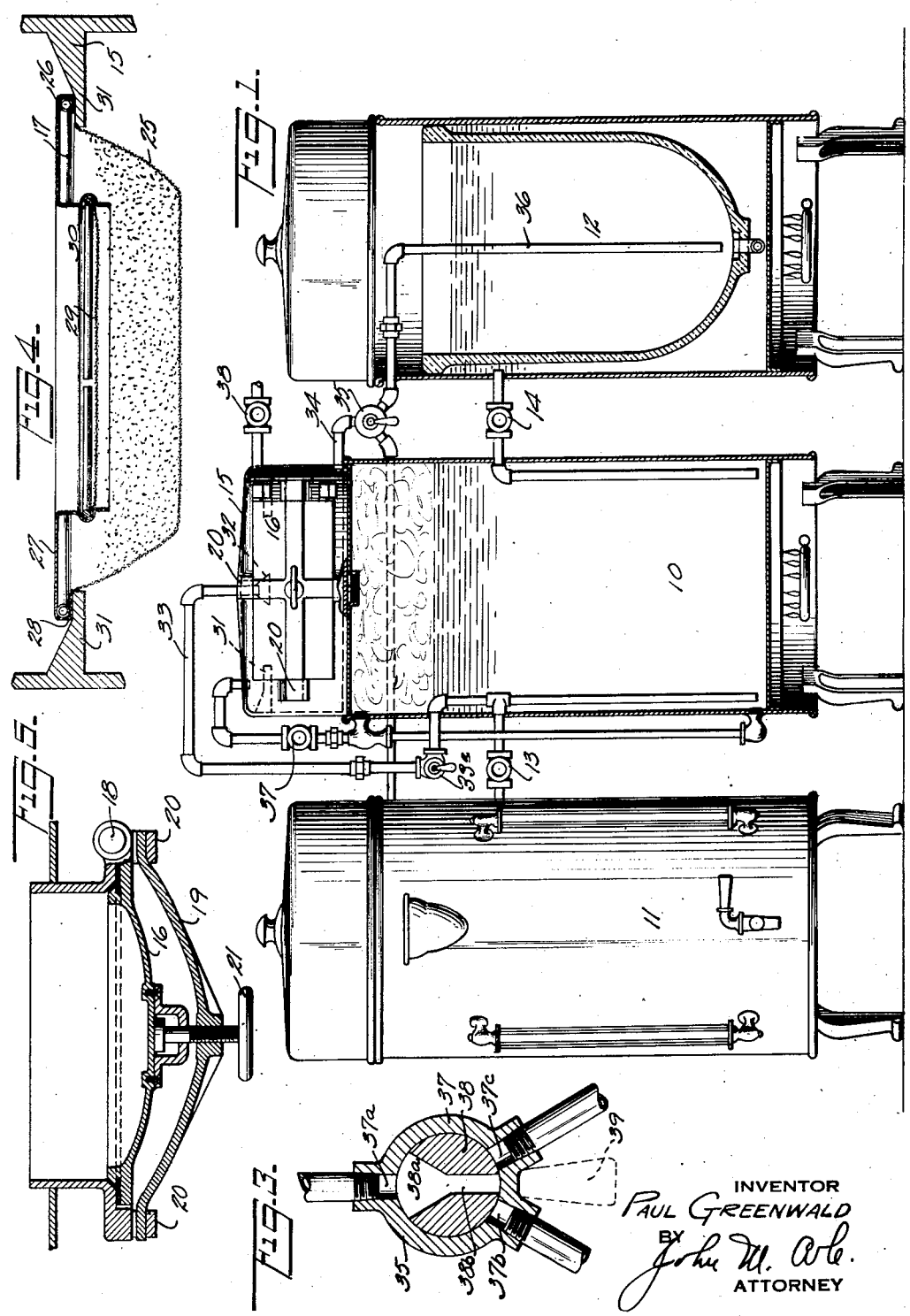

1,751,477

UNITED STATES PATENT OFFICE

PAUL GREENWALD, OF BROOKLYN, NEW YORK, ASSIGNOR TO UNITED KITCHEN EQUIPMENT CO., INC., A CORPORATION OF NEW YORK

METHOD OF AND APPARATUS FOR MAKING INFUSIONS OF COFFEE, TEA, AND THE LIKE

Application filed July 17, 1928. Serial No. 293,394.

The present invention relates to methods of and apparatus for making infusions of coffee, tea, and the like, and is more particularly directed toward methods and apparatus suitable for employment in restaurants, lunch rooms, and the like.

The generally accepted method of making coffee in restaurants and lunch rooms is to employ a pressure boiler and one or more urns associated with the boiler and heated from the boiler or by a separate heater. The boiler is used merely to supply hot water and steam. In some cases combined boilers and urns are employed. The coffee grindings are placed in a bag or sack removably supported in the upper part of the urn and hot water is passed from the pressure boiler over these grindings to fill the urn to the desired level, after which a small quantity of the weak coffee extract is withdrawn into a vessel and poured by hand back through the coffee grindings to acquire the desired strength.

This common type of apparatus is not entirely satisfactory for many well known reasons. One of the principal objections is the necessity of opening up the top of the urn while repouring the coffee, resulting in loss of aroma with escape of the vapor, requiring hoods and the like for ventilation. The repouring of the coffee by hand in this manner is not sanitary, it requires the continued attention of the operator and there is always the possibility of one being burnt or scalded while handling the hot liquid or by the hot steam escaping from the top of the urn. Furthermore there is spillage of coffee and dripping of water bringing about an untidy appearance about the battery of urns.

Inasmuch as the lower part of the coffee bag is immersed in the extract, while the coffee is being prepared and until considerable part of the coffee is withdrawn, it is impossible to adequately drain the grindings until after the coffee extract is partially or entirely used. As a result, the bag and grindings are generally left in the urn until the coffee is all or nearly all used. If the coffee, however, is not used promptly, the steaming of the grindings causes a continued extraction of caffein and other soluble bitter elements so that the last gallon or so of coffee extract in the urn is black and too strong for ordinary purposes. This either has to be discarded or is poured out and used in the next batch of coffee made either in that urn or in another urn. As the coffee bag is above the hot liquid and subject to steam, there is considerable liability of receiving painful burns when removing the coffee bag. The grindings do not dry out in the urn, so that there may be troublesome dripping while handling the spent grindings.

Various arrangements have been suggested for attempting the automatic repouring of coffee, as well as taking care of the last gallon or so of coffee in the urn. These devices, however, generally employ pumps or aspirators to provide a circulation of coffee extract. The pumps introduce many complications into the coffee making outfit, such as electrical troubles in the use of motors and wiring devices about the boiler. Pumps and aspirators used as heretofore suggested have been found to be ineffective.

Attempts have also been made to employ an auxiliary pressure tank and effect an automatic repouring of the coffee by using steam under pressure for forcing the liquid out of the auxiliary tank connected with the urn. This type of device has been found defective because the boiler is of too small capacity to generate sufficient steam to develope the necessary power for moving the liquid, and overcome the quick loss of steam pressure caused by absorption of the steam in contact with the cooler liquid sought to be transferred.

All these attempts at automatic repouring have also materially increased the cost of the urn or urns on account of the employment of numerous special fittings and devices in an endeavor to effect the repouring of the coffee. Notwithstanding the demand for automatic repouring, none of the automatic repouring devices heretofore suggested have, so far as I am aware, been accepted in the trade; it is still practically the universal custom to employ hand repouring.

The present invention contemplates methods of and apparatus for making infusions and extractions wherein the repouring may be accomplished in a more expeditious manner than the apparatus heretofore available, and in apparatus less expensive and less likely to get out of order or require special attention.

According to the more simple construction, one is able to employ a boiler and coffee urn substantially the same as those in common use. The boiler and urn may be separate units or may be combined if desired. The additional apparatus which in the more simple form of construction may consist of an auxiliary grindings-receiver chamber placed at a higher elevation than the urn and connected to the boiler to receive at will either water or steam and to be vented or not as desired.

The present invention contemplates a method of operation wherein the repouring of the coffee extract is effected by employing steam for the purpose of expelling the air from the auxiliary chamber and connections leading to the urn after which the steam supply is cut off and the chamber allowed to cool reducing the pressure in the chamber sufficiently to suck the liquid from the urn back into the chamber, where it extracts the grindings therein. The chamber is then vented and the liquid allowed to drain into the urn. Additional repourings may be effected by repeating the latter operations.

The invention also contemplates the continuous repouring of the coffee extract by means of a steam jet or other motive power acting on the extract in a closed hydraulic circuit which circuit includes the liquid in the urn open to the atmosphere.

According to the present invention the coffee grindings are placed in the auxiliary chamber above referred to and as soon as the last repouring has been completed, the spent coffee grindings may be removed in a substantially dry condition and without liability of burning.

Furthermore inasmuch as the repouring operation may readily be effected as many times as desired, at a high temperature, it is possible to obtain from the coffee grindings a much higher percentage of the extract without producing a bitter coffee.

The accompanying drawings show, for purposes of illustrating the present invention, two of the many possible embodiments in which the present invention may take form, it being understood that the drawings are illustrative of the invention rather than limiting the same.

In these drawings:

Figure 1 is an elevational view with parts in section showing a battery of urns and boiler embodying the present invention, and arranged for manually controlled repouring;

Figure 2 is a view similar to Figure 1 showing a modified arrangement of parts for accomplishing continuous repouring;

Figure 3 is a diagrammatic view of a form of a two way, three position valve;

Figure 4 is a sectional view through the grinding receiving chamber showing a form of bag for holding the grindings; and Figure 5 is a sectional view through a door for the grindings receiving chamber.

The pressure boiler 10 may be of the conventional type. It is associated with two urns 11 and 12 also af conventional type. As here shown the water jackets of these urns are connected to water supply valves 13 and 14 so that the jackets may be refilled from the boiler. The boiler and urns may be provided with the usual water gages, supply and drain valves and the safety valve customarily employed. These are omitted from the drawings for the sake of clearness.

A grindings receiving chamber 15 of suitable size and shape is supported at a higher elevation than the urn. A most convenient place to support this chamber is to place it directly on top of the boiler. It, however, is an independent structure and preferably merely rests on the boiler and is not a part of the boiler construction. This chamber has a comparatively large filling door 16 to permit placing the grindings containing bag 17 in the chamber. Any suitable form of steam tight and liquid tight door may be used. For convenience, the door here shown is in the form of a substantially flat plate hinged at 18. This door may be held tight by a cross shaped bridging member 19 which cooperates with stationary lugs 20 carried by the frame of the door. A hand screw 21 may be provided to facilitate clamping the door tight.

A suitable form of grindings holding bag is shown in Figure 4. This includes a muslin sack 25 of suitable size and shape supported on a split ring 26. A sheet metal cover 27 has folded side edges 28 adapted to embrace or receive the side portions of the split ring 26. This metal cover carries a smaller cloth insert 29 for the purpose of preventing spattering of the grindings. The insert 29 may be held in place by a split ring 30. The grindings receiving bag 25 may be supported on lugs 31 extending inwardly from the side of the grindings receiving chamber 15.

The grindings receiving bag 25 is so arranged that it is directly underneath a spray 32 connected by piping 33 with a water controlling valve 33ª so that boiling water may be passed from the boiler through the spray and onto the coffee grindings. This hot water with a weak extract is allowed to drain out through the pipe 34 two-way valve 35 and pipe 36 into the urn 12. In practice, a sufficient quantity of boiling water will be passed through the grindings and into the urn to fill the urn to the desired level as indicated by the usual gage, after which the valve 33ª will be closed.

In order that the weak extract now in the urn may be again brought into contact with the coffee grindings in the chamber 15, one next opens the steam valve 37 to admit steam to the chamber 15. This steam will fill the chamber, pass down through the pipe 34, valve 35 and bubble out through the pipe 36 thereby expelling all of the air from the grindings receiving chamber and from the pipe. The valve 37 is then closed and as soon as the steam supply is cut off, the chamber 15 cools slightly, allowing the steam to condense. This causes a drop in pressure which results in a reversed flow of the liquid in the urn sucking this liquid up into the chamber to substantially fill the chamber. The pressure of the liquid in the chamber will be atmospheric pressure less the hydrostatic pressure of the water column connecting the two quantities of liquid. This boiling hot water will again extract the coffee grindings.

To return the strengthened coffee extract from the chamber to the urn, one next opens a vent valve 38 which admits air to the chamber 15 and allows the liquid to drain down through the pipe 34, valve 35, and pipe 36 into the urn. Inasmuch as it is possible to suck up a large percentage of the coffee extract, and hold it about the grindings for a desired time, a single repouring will generally suffice to make coffee of the desired strength. Additional repourings may be easily had by closing the vent 38 and opening steam valve 37 to repeat the expulsion of air and the repouring of the coffee extract.

It will be noted that the present method of repouring the coffee makes it unnecessary to open the urn or for anyone to handle any of the hot liquid. There is no possibility of loss of strength or flavor of the coffee extract on account of escaping steam and there is also no possibility of becoming burnt by the hot vapors or the liquid.

As soon as the last repouring has been effected, one can open the door in the grindings receiving chamber and remove the spent grindings. This is readily accomplished inasmuch as the liquid is completely drained from the bag and the grindings are in a substantially dry condition. In view of the fact that there is no loss of coffee strength and the possibility of obtaining the desired strength without repeated repourings by hand, there results a remarkable saving in the amount of coffee grindings necessary to produce the desired quantity and quality of coffee extract. The saving in the amount of coffee grindings employed is very large, amounting to about one-fifth.

The urn 11 is like the urn 12 and is connected with valve 35 by a pipe 36ª. When one desires to make coffee in the urn 11 instead of the urn 12, the valve 35 is shifted so as to connect the urn 11 to the chamber instead of the urn 12. If one desires to transfer the coffee extract from one urn to the other, it is possible to suck up the extract in one urn and then shift the valve 35 to allow the coffee to return to the other urn when the chamber 15 is vented. Where a single urn is employed or where the urn is placed inside the boiler, the valve 35 may be omitted.

The valve 35 is preferably a two way, three position valve and may be of any desired form. For simplicity it is here indicated as consisting of a key valve having a fixed casing 37, movable barrel 38 and controlling key 39. The barrel 38 is cut away at 38ª and 38ᵇ to provide passageways for the liquid. The barrel can be moved so as to connect the passageway 37ª in the casing with the passageway 37ᵇ or the passageway 37ᶜ in the casing. When the valve is in the mid position as indicated in Figure 3, it is closed.

The arrangement illustrated in Figure 2 is generally the same as that shown in Figure 1 except that provisions are made for permitting continuous repouring of the coffee extract. The boiler 10', urns 11' and 12' and grindings receiving chamber 15' may be the same as before. It is to be understood that the customary piping and valves employed in a battery of urns will be provided even though the same is not indicated in the drawings.

The boiling water is passed from the boiler 10' through the spray in the grindings receiving chamber 15' by means of valve 33' and connecting pipe as before. The coffee extract is passed down through the pipe 34' into a combined injector and two way valve 35' which is connected by pipe 36' leading to the urns.

A pipe 40 leads from the lower part of each urn up to a two way valve 41 similar to the valve 35 and connected into the top of the grindings receiving chamber 15', preferably above the grindings bag.

This chamber is connected to the upper part of the boiler by a steam supply pipe 42 and two way valve 43 similar to the valve 35. This valve 43 is connected to admit steam to the grindings receiving chamber or to direct steam to a pipe 44 and injector 45 carried in, or associated with, the valve 35'.

In this form of construction, the boiling water is poured onto coffee grindings and allowed to drain to the desired urn as previously described. To effect the suction of the weak extract back into the grindings receiving chamber, the valve 41 is turned to connect the urn with the chamber and steam is passed through the valve 43 to expel the air from the chamber and pipes. The steam is then shut off and the liquid allowed to suck back up into the grindings receiving chamber, a gage 46 being provided to show that the chamber is filled. The valve 43 is then turned to pass steam through the pipe 44 and injector 45, and as this steam escapes through the nozzle, it will set up a circulation of liquid in the closed hydraulic system.

Very little steam velocity is necessary for accomplishing this circulation because the liquid is at all times under substantially atmospheric pressure. It is merely necessary to overcome the friction of the liquid in the pipes. It will be noted that in this form of construction the repouring is carried out without the use of any pumps or parts likely to get out of repair. The coffee extract is not poured out into the air and allowed to steam or lose its strength, and there is no attempt made to lift the extract and cause it to spray over the coffee grindings at full atmospheric pressure.

In both forms of construction illustrated, the piping is shown as one which would accomplish the passage of the boiling water directly through the grindings and into the urn to make a weak extract. It is of course possible to pass the boiling water from the boiler directly into the urn and effect an extraction by sucking the water from the urn back into the grindings receiving chamber and repeating this process until the desired strength is obtained. This, however, consumes more time than the other and more direct process.

The present form of construction employs standard and well known types of valves which are not at all likely to get out of order or cause difficulty of operation. If for any reason such should be the case, the battery of urns is still available for hand repouring which may be accomplished in the heretofore customary manner.

It is obvious that the invention may be embodied in many forms and constructions, and I wish it to be understood that the particular forms shown are but a few of the many forms. Various modifications and changes being possible, I do not limit myself in any way with respect thereto.

What is claimed is:

1. The method of repouring coffee and the like which consists in passing steam through a grindings receiving chamber and a pipe leading nearly to the bottom of a coffee urn to expel air therefrom, shutting off the steam to allow the chamber to cool and reduce the pressure sufficiently to suck liquid from the urn into the chamber where it extracts the grindings, and thereafter venting the chamber to allow the liquid extract to drain into the urn.

2. The method of making extracts or infusions from coffee grindings and the like which consists in placing water in a container, passing steam through a grindings receiving chamber disposed above the container and on through connections leading underneath the surface of the liquid in the container to expel air from the chamber and connections, cutting off the steam supply to allow the chamber to cool and reduce the pressure therein sufficiently to suck the liquid from the container into the chamber where it extracts the material therein, and thereafter venting the chamber to allow the liquid to drain into the container.

3. The method of making extracts or infusions from coffee grindings or the like, which consists in passing a predetermined quantity of boiling water through grindings in a grindings receiving chamber to make an extract, draining said extract into an extract container maintained at about the temperature of boiling water, cutting off the water supply and passing steam through the chamber and the drain connections to the liquid container to expel air therefrom, cutting off the steam and allowing the chamber to cool and reduce the pressure therein sufficiently to suck the extract into the chamber where it further extracts the grindings, and thereafter venting the chamber to allow the strengthened extract to drain into the container.

4. The method of repouring coffee extract which consists in effecting a circulation of the liquid from a coffee urn to a grindings receiving chamber and back to the urn under the influence of gravity and at pressures substantially atmospheric.

5. In the making of coffee extract, the step which consists in employing steam to expel air from a grindings receiving chamber in communication with an extract container.

6. In the making of coffee extract, the step which consists in allowing a chamber containing coffee grindings and steam and in communication with an extract container to cool sufficiently to suck liquid from the container to the chamber.

7. In the making of coffee extract, the step which consists in venting a chamber containing coffee grindings and extract at less than atmospheric pressure to allow the extract to drain from the chamber.

8. In coffee making apparatus, a pressure boiler, an urn, a grindings receiving chamber at a higher elevation than the urn, a pipe connecting the chamber and urn, and valve means for introducing water or steam to the chamber and for venting the chamber at will, whereby liquid may be transferred from the boiler through the chamber to the urn or moved back and forth between the urn and chamber.

9. Apparatus for making infusions and extractions, comprising a boiler adapted to contain water and steam under pressure greater than atmospheric, an extract container open to the atmosphere and adapted to contain liquid extract, an auxiliary chamber at a higher elevation than the liquid container, said chamber having a closable vent and being adapted to receive material to be extracted, and connections between the boiler, the liquid container and the auxiliary chamber to permit filling the container with hot water from the boiler and for effecting the transfer of liquid from the container to the auxiliary chamber and the return of the liquid to the container both under the influence of gravity and at substantially atmospheric pressure.

10. Apparatus for making infusions and extractions, comprising a boiler adapted to contain water and steam under pressure greater than atmospheric, an extract container open to the atmosphere and adapted to contain liquid extract, an auxiliary chamber at a higher elevation than the liquid container, said chamber having a closable vent and being adapted to receive material to be extracted, and connections between the boiler, the liquid container and the auxiliary chamber to permit passing hot water from the boiler through the chamber and filling the container therewith and for effecting the transfer of such liquid in the container to the auxiliary chamber and the return of the liquid to the container both under the influence of gravity and at substantially atmospheric pressure.

11. Apparatus for making infusions and extractions, comprising a boiler adapted to contain water and steam under pressure greater than atmospheric, an extract container open to the atmosphere and adapted to contain liquid extract, an auxiliary chamber at a higher elevation than the liquid container, said chamber having a closable vent and a steam tight filling door to permit the insertion of a bag of material to be extracted, and connections between the boiler, the liquid container and the auxiliary chamber to permit filling the container with hot water from the boiler and for effecting the transfer of liquid from the container to the auxiliary chamber and the return of the liquid to the container both under the influence of gravity and at substantially atmospheric pressure.

12. Apparatus for making infusions and extractions, comprising a boiler adapted to contain water and steam under pressure greater than atmospheric, a plurality of extract containers open to the atmosphere and adapted to contain liquid extract, an auxiliary chamber at a higher elevation than the liquid containers, said chamber having a closable vent and being adapted to receive material to be extracted, and connections between the boiler, the liquid containers and the auxiliary chamber to permit filling either container with hot water from the boiler and for effecting the transfer of liquid from that container to the auxiliary chamber and the return of the liquid to that container or into the other container, both transfers under the influence of gravity and at substantially atmospheric pressure.

13. A grindings receiving chamber for coffee making apparatus comprising a substantially closed drum provided with an opening adapted to receive a charge or sac of coffee grindings, a steam tight door for closing the opening, and a water inlet above the grindings.

14. In a coffee making apparatus, a grindings receiving chamber comprising a substantially closed drum provided with an opening adapted to receive a charge or sac of coffee grindings, a steam tight door for closing the opening, and a water inlet above the grindings, valve controlled means for admitting steam, water, or air to the chamber, and a drain for the chamber.

15. The method of repouring coffee extract through a closed grindings receiving chamber connected by pipes to an urn open to the atmosphere, which consists in producing a partial vacuum in the chamber to suck liquid from the urn to the chamber, and then injecting steam into one of the pipes to cause a continuous flow of coffee extract.

16. The method of repouring coffee and the like which consists in passing steam through a grindings receiving chamber and two pipes leading nearly to the bottom of a coffee urn to expel air therefrom, shutting off the steam to allow the chamber to cool and reduce the pressure sufficiently to suck liquid from the urn into the chamber where it extracts the grindings, injecting steam into one of the pipes to cause a continuous repouring of the coffee extract, and thereafter venting the chamber to allow the liquid extract to drain into the urn.

17. Apparatus for making coffee extract, comprising a boiler adapted to contain water and steam under pressure greater than atmospheric, an urn, a grindings receiving chamber at a higher elevation than the urn, a closable vent for the chamber, a pipe leading from the chamber to the urn, a water pipe leading from the boiler to the top of the chamber, a valve for controlling the flow of hot water from the boiler through the chamber and into the urn, a steam pipe between the boiler and chamber whereby air may be expelled from the chamber so that the extract will be sucked up into the chamber when the steam is shut off and the chamber cools, and a second pipe connecting the urn and top of the chamber, and an injector in the first pipe to set up a continuous circulation of extract.

18. A continuously repouring coffee making apparatus having a closed hydraulic circuit including an urn open to the atmosphere, a grindings receiving chamber above the urn, and pipes interconnecting the urn and chamber, means for filling the chamber substantially full of liquid at a pressure corresponding to atmospheric pressure less the hydrostatic pressure of the liquid column, and a steam injector for setting up a continuous circulation of liquid from the urn to the chamber and back to the urn.

19. A coffee making apparatus having an urn open to the atmosphere, a closed grindings receiving chamber above the urn, a pipe interconnecting the chamber and urn, means for filling the chamber substantially full of liquid from the urn, the liquid being held at a pressure corresponding to atmospheric pressure less the hydrostatic pressure of the liquid column, and a vent for opening the chamber to allow the liquid therein to drain into the urn.

PAUL GREENWALD.